McFARLAN & DAVIS.
Corn Sheller.
No. 19,862.
Patented April 6, 1858.
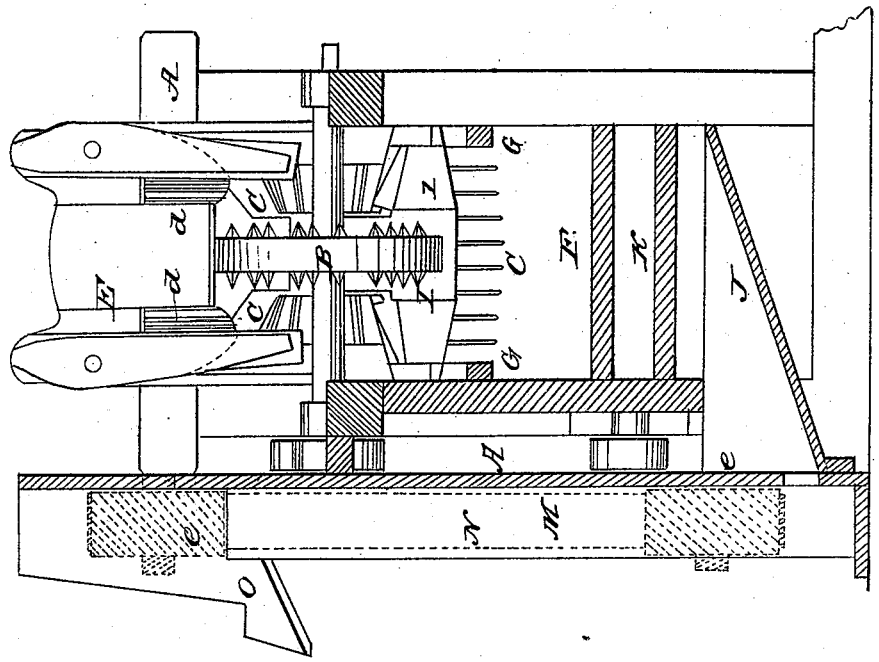
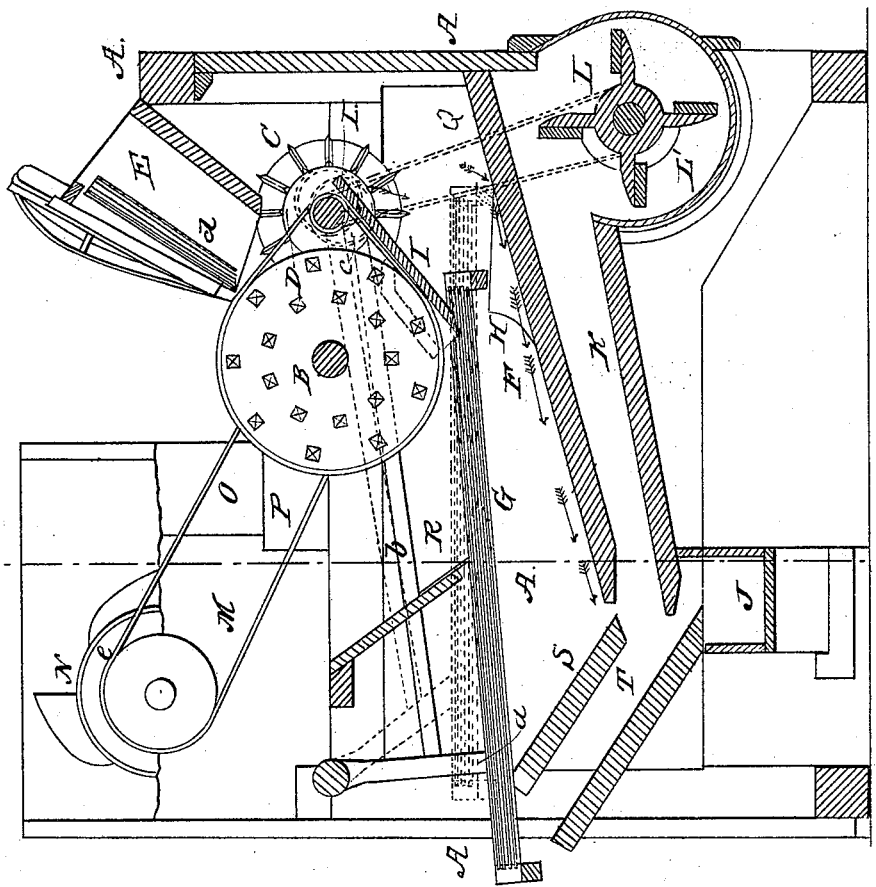

UNITED STATES PATENT OFFICE.

THOS. W. McFARLAN, OF SALEM, OHIO, AND LEVIS H. DAVIS, OF WEST CHESTER, PENNSYLVANIA.

CORN-SHELLER.

Specification of Letters Patent No. 19,862, dated April 6, 1858.

*To all whom it may concern:*

Be it known that we, THOMAS W. McFAR-LAN, of Salem, Ohio, and LEVIS H. DAVIS, of West Chester, Pennsylvania, have invented certain new and useful Improvements in Picker-Wheel Corn-Shellers; and we do hereby declare that the following is a full, clear, and exact description of the same, reference being had to the accompanying drawings, forming part of this specification, in which—

Figure 1 is a vertical longitudinal section of a picker wheel corn sheller with our improvements. Fig. 2, is a vertical transverse section of the same.

Similar letters of reference in each of the figures indicate corresponding parts.

The nature of our invention consists: 1st. In providing a stationary gutter shaped guard between and underneath the bevel picker wheels and in such relation to the vibrating riddle that all possibility of the cobs falling behind the head end of the riddle and mixing with the corn is entirely prevented.

Our invention consists 2nd. in having the head end of the riddle rest upon a horizontal projection of an inclined board, whereby as the riddle moves forward or toward the tail end of the machine an opening is formed for the passage under the riddle of whatever corn may by chance fall from the picker wheels behind the head of the riddle.

Our invention consists 3rd. In lining the spouts through which the ears of corn are fed to the picker wheel with a thin, elastic or yielding metal lining for directing the ears of corn, with greater certainty as they pass through them, on to the picker wheel than what they are when simply the ordinary flat spring is used.

To enable others skilled in the art to make and use our invention we will proceed to describe its construction and operation.

A, represents the frame of a picker and bevel wheel corn sheller. B, C, C, the picker wheels geared together by a band D.

E, is the head or chute through which the ears of corn are fed to the wheels B, C, C. F, the inclined board upon which the corn falls from the riddle G, the riddle upon which the cobs and shelled corn fall. This riddle is suspended at $a$, and is vibrated back and forth by means of a connecting rod $b$, and eccentric $c$.

H, is a horizontal projection on the inclined board F, for keeping the head end of the riddle elevated while it moves forward, over the inclined board, from the position shown in red to the position shown in black. It is by thus holding the riddle elevated as may be evident from the drawing, that an opening is formed, as the riddle moves forward, for the passage of whatever corn may fall behind the head of the riddle down the incline board.

I, is the gutter shaped inclined guard for preventing the cobs getting behind the head of the riddle, and passing down the incline board, and mixing with the shelled corn. This guard overlaps some distance the riddle and extends up between the two bevel picker wheels, being attached firmly to each side of the frame A. This guard in connection with the projection H, is very essential; it and the projection H, preventing the choking of the machine, and the mixing of the cobs with the shelled corn.

The head E, or each of its chutes is furnished internally with a thin metal lining $d'$, which extends from the top of the chute in a circle down to the bottom of the same, being pivoted at its upper end and left loose at its lower end, and constructed and arranged so as to be capable of yielding to different sized ears, and still serving with unerring certainty to guide the ears—whether put in butt or end forward—on to the picker wheels. This device is to be used in connection with the ordinary narrow flat spring which is usually employed alone for effecting this object.

Q, is a band for combining the fan with the picker and bevel wheels.

R, is a flexible partition for preventing the corn passing off with the cobs and S, T, are inclined stops for preventing the corn being blown off with the chaff.

Operation: The ears of corn are fed through the chutes of the head and guided to the picker wheels by the elastic linings. Being shelled, the grains and the cobs fall upon the riddle, the cobs being prevented from falling behind the head by the guard. At this place they are separated, the former falling through the bars of the riddle and the latter continuing to move over the riddle and escaping under the flexible partition R. As the grain passes from the riddle it falls upon the incline board F, and descends into the transverse spout J, being separated from chaff by the blast of the fan L.

Whatever grain falls behind the head of the riddle during the shelling operation is allowed to pass under the riddle through the passage forward by keeping the riddle elevated as it moves forward.

What we claim as our invention and desire to secure by Letters Patent, is:

1. The gutter shaped guard I, arranged between and underneath the bevel picker wheels, and overlapping the head of the vibrating riddle; substantially as and for the purposes set forth.

2. Having the head end of the riddle rest upon a horizontal projection of an inclined board substantially as and for the purpose set forth.

3. Lining the spouts or chutes of the head E, with a thin pivoted or yielding metal lining, in the manner and for the purpose set forth.

THOS. W. McFARLAN.
LEVIS H. DAVIS.

Witnesses to the signature of Thos. W. McFarlan:
G. YORKE AT LEE,
ROBT. W. FENWICK, Witnesses to the signature of Levis H. Davis:
HENRY FLEMING,
GEORGE WHITE.